US010581889B2

(12) United States Patent
Kovega et al.

(10) Patent No.: US 10,581,889 B2
(45) Date of Patent: Mar. 3, 2020

(54) METHODS AND SYSTEMS FOR DETECTING ABNORMAL USER ACTIVITY

(71) Applicant: YANDEX EUROPE AG, Lucerne (CH)

(72) Inventors: Dmitriy Nikolaevich Kovega, Mytishchi (RU); Ekaterina Aleksandrovna Kovega, Mytishchi (RU)

(73) Assignee: YANDEX EUROPE AG, Lucerne (CH)

( * ) Notice: Subject to any disclaimer, the term of this patent is extended or adjusted under 35 U.S.C. 154(b) by 194 days.

(21) Appl. No.: 15/864,127

(22) Filed: Jan. 8, 2018

(65) Prior Publication Data

US 2018/0295146 A1 Oct. 11, 2018

(30) Foreign Application Priority Data

Apr. 5, 2017 (RU) ................................ 2017111477

(51) Int. Cl.
*H04L 29/06* (2006.01)
*H04L 29/08* (2006.01)

(52) U.S. Cl.
CPC ...... *H04L 63/1425* (2013.01); *H04L 63/1416* (2013.01); *H04L 63/08* (2013.01); *H04L 67/22* (2013.01)

(58) Field of Classification Search
CPC ............. H04L 63/1416; H04L 63/1425; H04L 63/1441
See application file for complete search history.

(56) References Cited

U.S. PATENT DOCUMENTS 8,522,331 B2 8/2013 Onozawa et al.
8,713,023 B1 4/2014 Cormack et al.
8,844,005 B2 9/2014 Jakobsson et al.
9,122,866 B1 9/2015 Kolman et al.
9,185,095 B1 11/2015 Moritz et al.
2008/0148376 A1* 6/2008 Onozawa ................ G06F 21/41 726/8

(Continued)

OTHER PUBLICATIONS

Kenig, "Distinguish between legitimate users and attackers—The secret sauce of DDoS protection", RADWARE, 2013, 7 pages.

(Continued)

*Primary Examiner* — Dao Q Ho
(74) *Attorney, Agent, or Firm* — BCF LLP

(57) ABSTRACT

Systems and methods for detecting abnormal user activity comprising: tracking, by the server, during a first time period, user activity associated with an application service, determining, by the server, that the user activity associated with the application service exceeds a respective first predetermined threshold of user activity during the first time period, in response to determining that the user activity exceeds the first predetermined threshold, tracking, during a second time period user activity associated with the application service, the tracking comprising tracking a content of the user interactions with the application service, determining that the user activity exceeds a second predetermined threshold of user activity during the second time period and in response to determining that the user activity exceeds the second predetermined threshold, triggering a user challenge procedure on a client device.

10 Claims, 11 Drawing Sheets

1010 1015 1020 1022 1024 1026 1028 1029

| | User activity on the client device | Tracking server | | | | |
|---|---|---|---|---|---|---|
| | | IP address | Timestamp | User Interaction Status | Content | Score |
| 1030 | user logs in on the money transfer service | 127.0.0.1 | 02.15.2017 13:55:35 -0700 | user_login_4141=1 | | 1 |
| | user transfers money to a contact | 127.0.0.1 | 02.15.2017 13:56:12 -0700 | user_transfer_4147=1 | John Doe | 5 |
| | user logs out of the money transfer service | 127.0.0.1 | 02.15.2017 14:12:05 -0700 | user_logout_4444=1 | | 1 |
| | ... | | | | | |
| | user login on the money transfer service | 127.0.1.1 | 02.15.2017 07:00:05 -0700 | user_login_5141=1 | | 1 |
| 1050 | **user transfers money to a contact** | **128.0.1.1** | **02.16.2017 20:13:51 -0200** | **user_transfer_6464=1** | **Unknown contact-hong kong** | **3** |
| | **user transfers money to a contact** | **128.0.1.1** | **02.16.2017 20:14:01 -0200** | **user_transfer_6464=1** | **Unknown contact-hong kong** | **3** |
| | **user buys a gift card** | **128.4.5.1** | **02.16.2017 20:14:01 -0200** | **user_buy_7667=1** | **gift card hongkong** | **8** |
| | **user buys a gift card** | **128.3.5.1** | **02.16.2017 20:14:04 -0200** | **user_buy_7667=2** | **gift card hongkong** | **8** |
| | **user buys a gift card** | **128.3.5.1** | **02.16.2017 20:14:06 -0200** | **user_buy_7667=3** | **gift card hongkong** | **8** |
| | **user buys a gift card** | **126.4.5.1** | **02.16.2017 20:14:08 -0200** | **user_buy_7667=4** | **gift card hongkong** | **8** |

(56) References Cited

U.S. PATENT DOCUMENTS

| | | | |
|---|---|---|---|
| 2009/0293121 A1 | 11/2009 | Bigus et al. | |
| 2015/0067845 A1* | 3/2015 | Chari | G06F 21/50 726/23 |
| 2016/0149883 A1 | 5/2016 | Arunkumar et al. | |
| 2016/0224777 A1 | 8/2016 | Rebelo et al. | |

OTHER PUBLICATIONS

"Behavioral Analysis: The Future of Fraud Prevention" by Victor Bouhnik, 2015, http://blog.securedtouch.com/behavioral-analysis-the-future-of-fraud-prevention.

* cited by examiner

410

415 420 422 424 426 428 429 430 440

| User activity on the client device | Tracking server | | | | |
|---|---|---|---|---|---|
| | IP address | Timestamp | User Interaction Status | Content | Score |
| user login on the email service | 127.0.0.1 | 01.01.2017 13:55:35 -0700 | user_login_5151=1 | | 0.5 |
| user opens and reads an email | 127.0.0.1 | 01.03.2017 13:56:12 -0700 | user_read_mail_5342=1 | | 0.75 |
| user sends an email | 127.0.0.1 | 01.04.2017 14:12:05 -0700 | user_send_mail_5253=1 | | 1 |
| ... | | | | | |
| user sends an email | 127.0.0.1 | 01.10.2017 07:00:05 -0700 | user_send_mail_5678=2 | | 1 |
| user sends an email | 127.0.0.1 | 01.11.2017 07:12:45 -0700 | user_send_mail_5875= 3 | | 1 |
| user opens and reads an email | 127.0.0.1 | 01.14.2017 08:14:59 -0700 | user_read_mail_5456 =2 | | 0.75 |
| ... | | | | | |
| user changes password | 128.0.1.1 | 01.23.2017 13:13:46 -0700 | user_pwd_change_1=1 | | 5 |
| user sends an email | 127.0.0.1 | 01.24.2017 05:15:15 -0700 | user_send_mail_5941=4 | | 1 |
| user changes phone number | 128.0.1.1 | 01.25.2017 09:13:48 -0700 | user_phone_change_1=1 | | 5 |
| user opens and reads an email | 128.0.1.1 | 01.28.2017 10:13:51 -0700 | user_read_mail_5843=3 | | 5 |
| user deletes an email | 128.0.1.1 | 01.29.2017 09:13:51 -0700 | user_del_mail_5939=1 | | 1 |

| User activity on the client device | Tracking server | | | | |
|---|---|---|---|---|---|
| | IP address | Timestamp | User Interaction Status | Content | Score |
| user login on social media service | 127.0.0.1 | 01.03.2017 13:55:35 -0700 | user_login_6000=1 | | .5 |
| user adds a contact | 127.0.0.1 | 01.05.2017 13:56:12 -0700 | user_addcontact _6100=1 | John Doe | .75 |
| user adds a contact | 127.0.0.1 | 01.05.2017 14:05:53 -0700 | user_addcontact_6112=2 | John Doe | |
| user posts a status update | 127.0.0.1 | 01.07.2017 10:12:05 -0700 | user_status _6115= 1 | | 1 |
| ... | | | | | |
| user writes a review for a place | 127.0.0.1 | 01.10.2017 07:00:05 -0700 | user_review_update_6222=2 | | 1 |
| user adds a contact | 127.0.0.1 | 01.12.2017 07:12:45 -0700 | user_addcontact_6342= 3 | | 1 |
| user posts a status update | 127.0.0.1 | 01.14.2017 08:14:59 -0700 | user_status _6687=1 | | 1 |
| ... | | | | | |
| user checks-in at a restaurant | 128.0.1.1 | 01.15.2017 02:13:46 -0200 | user_checkin_6656=1 | | 5 |
| user posts a photo album | 128.0.1.1 | 01.16.2017 02:13:48-0200 | user_album_6785=1 | | 5 |
| user posts a status update | 128.0.1.1 | 01.17.2017 02:13:51 -0200 | user_status_6945=2 | | 5 |
| user posts a photo album | 128.0.1.1 | 01.18.2017 02:13:51 -0200 | user_status_6946=2 | | |

| User activity on the client device | Tracking server | | | | |
|---|---|---|---|---|---|
| | IP address | Timestamp | User Interaction Status | Content | Score |
| user logs in on the money transfer service | 127.0.0.1 | 01.04.2017 13:55:35 -0700 | user_login_4141=1 | | 1 |
| user transfers money to a contact | 127.0.0.1 | 01.05.2017 13:56:12 -0700 | user_transfer_4147=1 | John Doe | 5 |
| user logs out of the money transfer service | 127.0.0.1 | 01.07.2017 14:12:05 -0700 | user_logout_4444=1 | | 1 |
| ... | | | | | |
| user pays electricity bill | 127.0.0.1 | 01.08.2017 07:12:45 -0700 | user_transfer_5147=1 | Provider X | 5 |
| user logout of the money transfer service | 127.0.0.1 | 01.08.2017 08:14:59 -0700 | user_logout_5444=1 | | 1 |
| ... | | | | | |
| user login on the money transfer service | 128.0.1.1 | 01.09.2017 02:13:46 -0200 | user_login_6146=1 | | 1 |
| user buys an item online | 128.0.1.1 | 01.09.2017 02:13:48-0200 | user_transfer_6156=1 | Online Market | 5 |
| user logout of the money transfer service | 128.0.1.1 | 01.09.2017 02:13:51 -0200 | user_logout_6464=1 | | 1 |
| ... | | | | | |
| user login on the money transfer service | 128.0.1.1 | 01.09.2017 02:13:51 -0200 | user_login_7152=1 | | 1 |
| user buys an item online | 128.0.1.1 | 01.09.2017 02:13:51-0200 | user_transfer_7167=1 | Super Furniture | 5 |
| user logout of the money transfer service | 128.0.1.1 | 01.09.2017 02:13:51 -0200 | user_logout_7477=1 | | 5 |

| User activity on the client device | Tracking server | | | |
|---|---|---|---|---|
| | IP address | Timestamp | User Interaction Status | Score |
| user login on the email service | 127.0.0.1 | 02.04.2017 13:55:35 -0700 | user_login_5151=1 | 0.5 |
| user opens and reads an email | 127.0.0.1 | 02.05.2017 13:56:12 -0700 | user_read_mail_5342=1 | 0.75 |
| user sends an email | 127.0.0.1 | 02.07.2017 14:12:05 -0700 | user_send_mail_5253=1 | 1 |
| ... | | | | |
| user sends an email | 127.0.0.1 | 02.10.2017 07:00:05 -0700 | user_send_mail_5678=2 | 1 |
| user sends an email | 127.0.0.1 | 02.12.2017 07:12:45 -0700 | user_send_mail_5875= 3 | 1 |
| user opens and reads an email | 127.0.0.1 | 02.14.2017 08:14:59 -0700 | user_read_mail_5456 =2 | 0.75 |
| ... | | | | |
| **user changes password** | **129.0.1.1** | **02.15.2017 02:13:46 -0200** | user_pwd_change_1=1 | 5 |
| **user changes phone number** | **128.0.1.1** | **02.15.2017 02:13:48 -0200** | user_send_mail_5941=4 | 5 |
| **user send emails to entirety of contact list** | **128.0.1.1** | **02.15.2017 02:13:51 -0200** | user_phone_change_1=1 | 5 |
| **user changes password** | **129.0.1.1** | **02.15.2017 02:14:01 -0200** | user_pwd_change_1=3 | 5 |

730 (rows from "user login on the email service" through the second "...")

750 (last four rows)

| **User activity on the client device** | **Tracking server** | | | | |
|---|---|---|---|---|---|
| | IP address | Timestamp | User Interaction Status | Content | Score |
| user login on the email service | 127.0.0.1 | 02.15.2017 13:55:35 -0700 | user_login=1 | | 0.5 |
| user opens and reads an email | 127.0.0.1 | 02.15.2017 13:56:12 -0700 | user_read_mail_5342=1 | | 0.75 |
| user sends an email | 127.0.0.1 | 02.15.2017 14:12:05 -0700 | user_send_mail_5253=1 | | 1 |
| ... | | | | | |
| user sends an email | 127.0.0.1 | 02.16.2017 07:00:05 -0700 | user_send_mail_5678=2 | | 1 |
| user sends an email | 127.0.0.1 | 02.16.2017 07:12:45 -0700 | user_send_mail_5875= 3 | | 1 |
| user opens and reads an email | 127.0.0.1 | 02.16.2017 08:14:59 -0700 | user_read_mail_5456 =2 | | 0.75 |
| ... | | | | | |
| **user send emails to entirety of contacts** | **128.0.1.1** | **02.16.2017 10:13:46 -0200** | **user_pwd_change_1=1** | **viagra** | **5** |
| **user send emails to entirety of contacts** | **125.0.1.1** | **02.16.2017 20:13:48 -0200** | **user_send_mail_5941=4** | **cheap drugs for free** | **5** |

830 (rows 1–8), 850 (rows 9–10)

| | User activity on the client device | Tracking server | | | | |
|---|---|---|---|---|---|---|
| | | IP address | Timestamp | User Interaction Status | Content | Score |
| 930 | user login on social media service | 127.0.0.1 | 02.15.2017 13:55:35 -0700 | user_login_6000=1 | | .5 |
| | user adds a contact | 127.0.0.1 | 02.15.2017 13:56:12 -0700 | user_addcontact _6100=1 | Jean Dupont | .75 |
| | user adds a contact | 127.0.0.1 | 02.15.2017 14:12:05 -0700 | user_addcontact_6112=2 | D Drumpf | |
| | user posts a status update | 127.0.0.1 | 02.15.2017 14:12:05 -0700 | user_status _6115= 1 | | 1 |
| | ... | | | | | |
| | user writes a review for a place | 127.0.0.1 | 02.16.2017 07:12:45 -0700 | user_review_update_6222=2 | | 1 |
| | user adds a contact | 127.0.0.1 | 02.16.2017 08:14:59 -0700 | user_status_8687= 1 | | 1 |
| 950 | **user posts a status update** | **127.0.0.1** | **02.16.2017 20:12:59 -0700** | **user_status _8688=1** | **Banned website** | **5** |
| | **user posts a status update** | **127.0.0.1** | **02.16.2017 20:13:46 -0700** | **user_status _8689=1** | **Banned website** | **5** |
| | **user posts a status update** | **128.0.0.1** | **02.16.2017 20:13:48 -0700** | **user_status _8690=1** | **Banned website** | **5** |
| | **user posts a status update** | **128.0.0.1** | **02.16.2017 20:13:51 -0700** | **user_status _8691=1** | **Banned website** | **5** |
| | **user posts a status update** | **128.0.0.1** | **02.16.2017 20:14:01 -0700** | **user_status _8692=1** | **Banned website** | **5** |
| | **user posts a status update** | **128.0.0.1** | **02.16.2017 20:55:35 -0700** | **user_status _8693=1** | **Banned website** | **5** |

| User activity on the client device | Tracking server | | | | |
|---|---|---|---|---|---|
| | IP address | Timestamp | User Interaction Status | Content | Score |
| user logs in on the money transfer service | 127.0.0.1 | 02.15.2017 13:55:35 -0700 | user_login_4141=1 | | 1 |
| user transfers money to a contact | 127.0.0.1 | 02.15.2017 13:56:12 -0700 | user_transfer_4147=1 | John Doe | 5 |
| user logs out of the money transfer service | 127.0.0.1 | 02.15.2017 14:12:05 -0700 | user_logout_4444=1 | | 1 |
| ... | | | | | |
| user login on the money transfer service | 127.0.1.1 | 02.15.2017 07:00:05 -0700 | user_login_5141=1 | | 1 |
| **user transfers money to a contact** | **128.0.1.1** | **02.16.2017 20:13:51 -0200** | **user_transfer_6464=1** | **Unknown contact-hong kong** | **3** |
| **user transfers money to a contact** | **128.0.1.1** | **02.16.2017 20:14:01 -0200** | **user_transfer_6464=1** | **Unknown contact-hong kong** | **3** |
| **user buys a gift card** | **128.4.5.1** | **02.16.2017 20:14:01 -0200** | **user_buy_7667=1** | **gift card hongkong** | **8** |
| **user buys a gift card** | **128.3.5.1** | **02.16.2017 20:14:04 -0200** | **user_buy_7667=2** | **gift card hongkong** | **8** |
| **user buys a gift card** | **128.3.5.1** | **02.16.2017 20:14:06 -0200** | **user_buy_7667=3** | **gift card hongkong** | **8** |
| **user buys a gift card** | **126.4.5.1** | **02.16.2017 20:14:08 -0200** | **user_buy_7667=4** | **gift card hongkong** | **8** |

1030 (rows 1–5), 1050 (rows 6–11)

FIG. 10

METHODS AND SYSTEMS FOR DETECTING ABNORMAL USER ACTIVITY

CROSS-REFERENCE

The present application claims priority to Russian Patent Application No. 2017111477, entitled "Methods and Systems for Detecting Abnormal User Activity," filed on Apr. 5, 2017, the entirety of which is incorporated herein by reference.

FIELD

The present technology relates to user authentication and more specifically to methods and systems for detecting abnormal user activity.

BACKGROUND

The expansion of the internet coupled with the multiplication of connected mobile electronic devices allows billions of people to use their mobile devices daily for learning, communicating, exchanging information and conducting financial transactions. While performing such activities, identity, personal information and sensitive data are often input into the device, stored on the device, and also sent through communication links and networks to service providers.

However, as the value and volume of sensitive information processed by mobile devices and online service providers has increased, so too have the efforts of malevolent parties to obtain sensitive information and exploit it for financial gain or other illicit purposes. Given that servers and mobile devices are accessible through the internet, often malevolent parties operate remotely from the systems they aim to compromise, thus reducing risks to themselves.

For example, they may perform cyber attacks on online systems and networking infrastructure, steal or otherwise compromise cryptographic keys, steal or guess passwords to individual's online and financial accounts, use email phishing and hijack their personal or financial accounts, perform unauthorized financial transactions, install malware on mobile devices or remote servers and networking equipment, etc. To mitigate these threats, mobile device makers and service providers typically implement various cyber-security measures to protect their online systems, coupled with basic authentication measures, such as using a personal identification code (PIC) or biometric ID to unlock a device and perform sensitive operations, as well as implementing anti-malware measures (both hardware and software) on the mobile device.

However, when malevolent parties succeed in gaining access to a user account, such as an email account or a social media account, or to a user device, the malevolent parties can compromise other linked accounts associated with the user, and may easily steal the identity of the user, defraud the user or use his account for spamming and defrauding other users.

Furthermore, considering the volume of financial information processed and exchanged daily via communication networks on mobile or other electronic devices and the potential for immediate financial gain for malevolent parties, gaining access to a user account by a malevolent party poses a threat to security.

U.S. Pat. No. 8,713,023 issued Nov. 10, 2015 to United Services Automobile Association (USAA) teaches methods and systems for behavioral profiling. In some embodiments, a method includes observing behavioral characteristics of user interactions during a current session with the user through one of a plurality of channels. Variations between the behavioral characteristics of the user interactions observed during the current session and a behavioral profile previously developed based on prior usage patterns of the user through the plurality of channels are identified, in real-time or near real-time. For the user to proceed in the session, a challenge level is implemented based on the variations between the behavioral characteristics and the behavioral profile.

U.S. Patent Publication No. 2016/0224777 by Rebelo et al. teaches that usage patterns of an authentic user of a mobile device are generated from data collected representing usage by the authentic user. These usage patterns may then be compared to monitored usage of the mobile device. If usage of the mobile device exceeds a threshold based on one or more of the usage patterns, access to data on the mobile device can be prevented.

SUMMARY

Embodiments of the present technology have been developed based on developers' appreciation of at least one technical problem associated with the prior art solutions. More specifically, developers of the present technology have appreciated that at least for the reasons outlined above, there is a need for methods and systems for detecting abnormal user activity.

Embodiments of the present technology have been developed based on developers' appreciation that while prior art solutions use thresholds to detect unusual user activity and subsequently block user access to a service or application, the unusual user activity may not necessarily be indicative of a compromised account, and the blocking of the user access may be ill-timed and inconvenient for the user (thus creating user dissatisfaction with the service that has blocked the user account).

The present technology further arises from an observation made by the developer(s) that continuously tracking every user interaction and the content of the user interaction on a plurality of services may be resource intensive from the point of view of the client device and the server when there is no suspicion of potentially abnormal user activity.

Therefore, developer(s) have devised method and systems for detecting abnormal user activity.

In accordance with a first broad aspect of the present technology, there is provided a method for detecting abnormal user activity, the method executable on a server, the server being connected to a plurality of client devices via a communication network, each client device of the plurality of client devices being associated with a respective user, the method comprising: tracking, by the server, during a first time period, user activity associated with a first application service performed on a first client device, the user activity including user interactions with the first application service, determining, by the server, that the user activity associated with the first application service exceeds a first predetermined threshold of user activity during the first time period, the first predetermined threshold having been determined based on past user activity associated with the first application service and performed on each client device of the plurality of client devices by the respective user, the user activity exceeding the first predetermined threshold being indicative of a potentially abnormal user activity on the first application service associated with the first client device, in response to determining that the user activity exceeds the first predetermined threshold, tracking, during a second time period, by the server, user activity associated with the first application service on the first client device, the tracking comprising tracking a content of the user interactions with the first application service, determining, by the server, that the user activity exceeds a second predetermined threshold of user activity during the second time period, the second predetermined threshold having been determined based on past user activity associated with the first application service and performed on each client device of the plurality of client devices, the user activity exceeding the second predetermined threshold being indicative of an abnormal user activity associated with the first client device, in response to determining that the user activity exceeds the second predetermined threshold, triggering, by the server, a user challenge procedure on the first client device, the user challenge procedure for authenticating the user of the first client device, the user challenge procedure being based on the user activity with the first application service during the first time period performed on the first client device.

In some implementations, the method may further comprise: responsive to the user challenge procedure response from the first client device matching the user activity during the first time period, allowing user activity with the plurality of application services, and responsive to the user challenge procedure response from the first client device not matching the user activity during the first time period, blocking access to the plurality of application services on the client device.

In some implementations, the tracking during the first time period and the second time period user activity associated with the first application service further comprises tracking user activity associated with a plurality of application services, the plurality of application services including the first application service.

In some implementations, each application service of the plurality of application services is associated with a respective first predetermined threshold, and wherein the plurality of application services including the first application service is associated with a single second predetermined threshold.

In some implementations, the tracking the user activity further comprises receiving, at the server, an indication of a user interaction with an application service, and associating a score, a timestamp and a status with the indication of the user interaction.

In some implementations, each respective first predetermined threshold associated with each application service of the plurality of application services is a respective first average score, the respective first average score having been determined based on the scores associated with each past user interaction on the respective application service.

In some implementations, determining that the user activity associated with the application service of the plurality of application services exceeds the respective first predetermined threshold during the first time period comprises adding each score associated with each user interaction of the user activity associated with the application service during the first time period and comparing a total score to the respective first average score.

In some implementations, the single second predetermined threshold is a second average score, the second average score having been determined based on the scores associated with each past user interaction of the past user activity on the plurality of services.

In some implementations, determining that the user activity exceeds the single second predetermined threshold during the second time period comprises adding each score associated with each user interaction of the user activity during the second time period and comparing a total score to the respective second average score.

In some implementations, the first predetermined threshold and the second predetermined threshold are further based on the timestamps of the user activity.

In some implementations, the content of the user interaction comprises at least one of a text content, a geolocation parameter, a device identifier, a banned keyword, and a banned website link.

In accordance with a second broad aspect of the present technology, there is provided a system for detecting abnormal user activity, the system being connected to a plurality of client devices via a communication network, each client device of the plurality of client devices being associated with a respective user, the system comprising: a processor, a non-transitory computer-readable medium comprising instructions, the processor, upon executing the instructions, being configured to cause: tracking, by the system, during a first time period, user activity associated with a first application service performed on a first client device, the user activity including user interactions with the first application service, determining, by the system, that the user activity associated with the first application service exceeds a first predetermined threshold of user activity during the first time period, the first predetermined threshold having been determined based on past user activity associated with the first application service and performed on each client device of the plurality of client devices by the respective user, the user activity exceeding the first predetermined threshold being indicative of a potentially abnormal user activity on the first application service associated with the first client device, in response to determining that the user activity exceeds the first predetermined threshold, tracking, during a second time period, by the system, user activity associated with the first application service on the first client device, the tracking comprising tracking a content of the user interactions with the first application service, determining, by the system, that the user activity exceeds a second predetermined threshold of user activity during the second time period, the second predetermined threshold having been determined based on past user activity associated with the first application service and performed on each client device of the plurality of client devices, the user activity exceeding the second predetermined threshold being indicative of an abnormal user activity associated with the first client device, in response to determining that the user activity exceeds the second predetermined threshold, triggering, by the system, a user challenge procedure on the first client device, the user challenge procedure for authenticating the user of the first client device, the user challenge procedure being based on the user activity with the first application service during the first time period performed on the first client device.

In some implementations, the system may further cause: responsive to the user challenge procedure response from the first client device matching the user activity during the first time period, allowing user activity with the plurality of application services, and responsive to the user challenge procedure response from the first client device not matching the user activity during the first time period, blocking access to the plurality of application services on the client device.

In some implementations, the tracking during the first time period and the second time period user activity associated with the first application service further comprises tracking user activity associated with a plurality of application services, the plurality of application services including the first application service.

In some implementation, each application service of the plurality of application services is associated with a respective first predetermined threshold, and wherein the plurality of application services including the first application service is associated with a single second predetermined threshold.

In some implementations, the tracking the user activity further comprises receiving, at the server, an indication of a user interaction with an application service, and associating a score, a timestamp and a status with the indication of the user interaction.

In some implementations, each respective first predetermined threshold associated with each application service of the plurality of application services is a respective first average score, the respective first average score having been determined based on the scores associated with each past user interaction on the respective application service.

In some implementations, determining that the user activity associated with the application service of the plurality of application services exceeds the respective first predetermined threshold during the first time period comprises adding each score associated with each user interaction of the user activity associated with the application service during the first time period and comparing a total score to the respective first average score.

In some implementations, the single second predetermined threshold is a second average score, the second average score having been determined based on the scores associated with each past user interaction of the past user activity on the plurality of services.

In some implementation, determining that the user activity exceeds the single second predetermined threshold during the second time period comprises adding each score associated with each user interaction of the user activity during the second time period and comparing a total score to the second average score.

In some implementations, the first predetermined threshold and the second predetermined threshold are further based on the timestamps of the user activity.

In some implementations, the content of the user interaction comprises at least one of a text content, a geolocation parameter, a device identifier, a banned keyword, and a banned website link.

In some implementations, the user challenge procedure comprises a question about a specific user interaction associated with an application service of the plurality of application services during the first time period.

In some implementations, the user challenge procedure comprises a question about a specific user interaction associated with an application service of the plurality of application services during the first time period.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smartphones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "document" is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A page may correspond to a document or a portion of a document. Therefore, the words "page" and "document" may be used interchangeably in some cases. In other cases, a page may refer to a portion of a document, such as a sub-document. It may also be possible for a page to correspond to more than a single document.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

FIG. 4 is an illustration of a first table of user activity in accordance with an embodiment of the present technology.

FIG. 5 is an illustration of a second table of user activity in accordance with an embodiment of the present technology.

FIG. 6 is an illustration of a third table of user activity in accordance with an embodiment of the present technology.

FIG. 7 is an illustration of a first table of potentially abnormal user activity in accordance with an embodiment of the present technology.

FIG. 8 is an illustration of a first table of abnormal user activity in accordance with an embodiment of the present technology.

FIG. 9 is an illustration of a second table of abnormal user activity in accordance with an embodiment of the present technology.

FIG. 10 is an illustration of a third table of abnormal user activity in accordance with an embodiment of the present technology.

DETAILED DESCRIPTION

Figure 1:
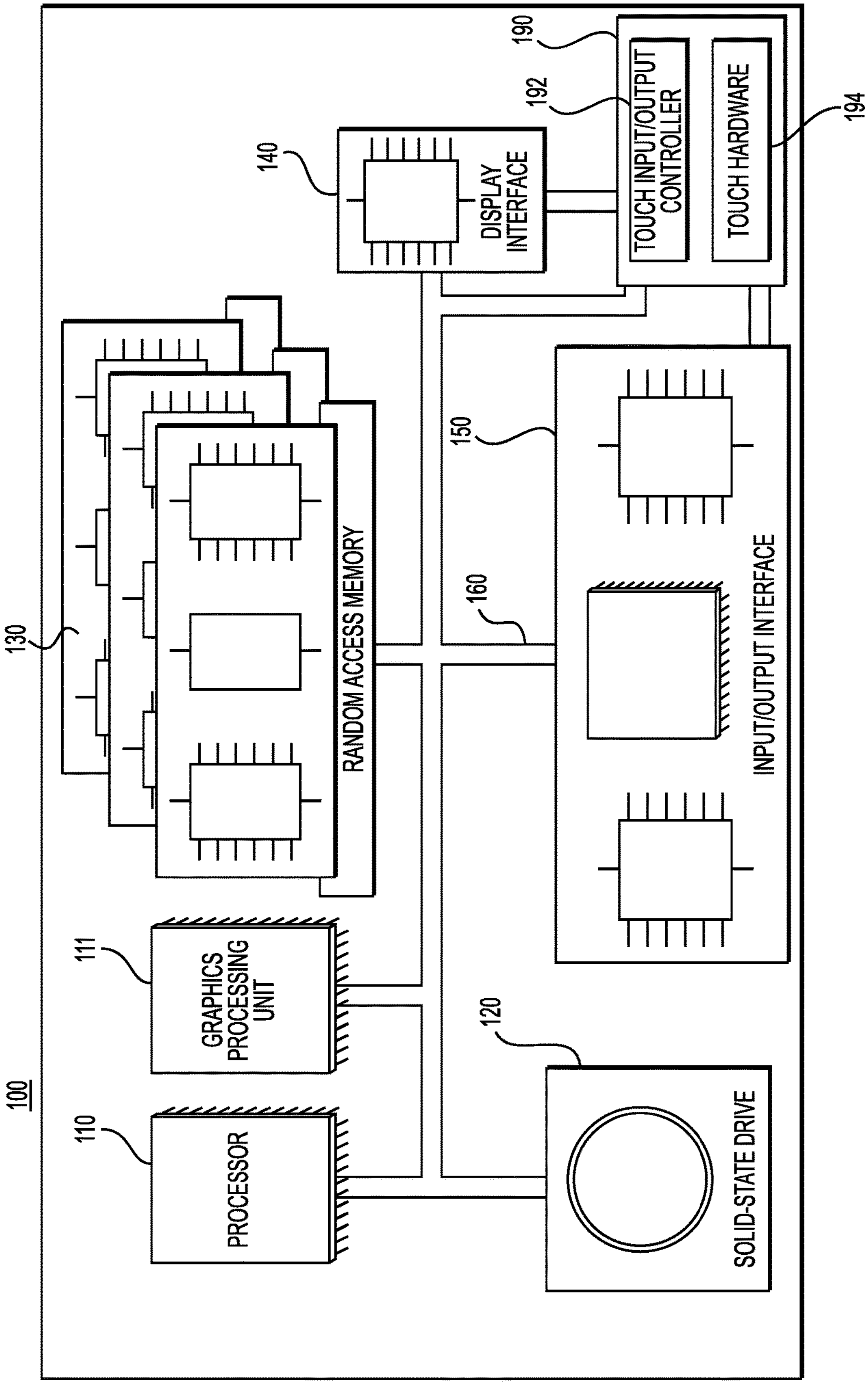
FIG. 1 is an illustration of components and features of a client device implemented in accordance with an embodiment of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a first client device 100 suitable for use with some implementations of the present technology, the first client device 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the first client device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the first client device 100 in addition or in replacement of the touchscreen 190.

According to implementations of the present technology, the solid-state drive 120 stores program instructions suitable for being loaded into the random access memory 130 and executed by the processor 110 and/or the GPU 111. For example, the program instructions may be part of a library or an application.

The first client device 100 may be a server, a desktop computer, a laptop computer, a tablet, a smartphone, a personal digital assistant or any device that may be configured to implement the present technology, as should be understood by a person skilled in the art.

Figure 2:
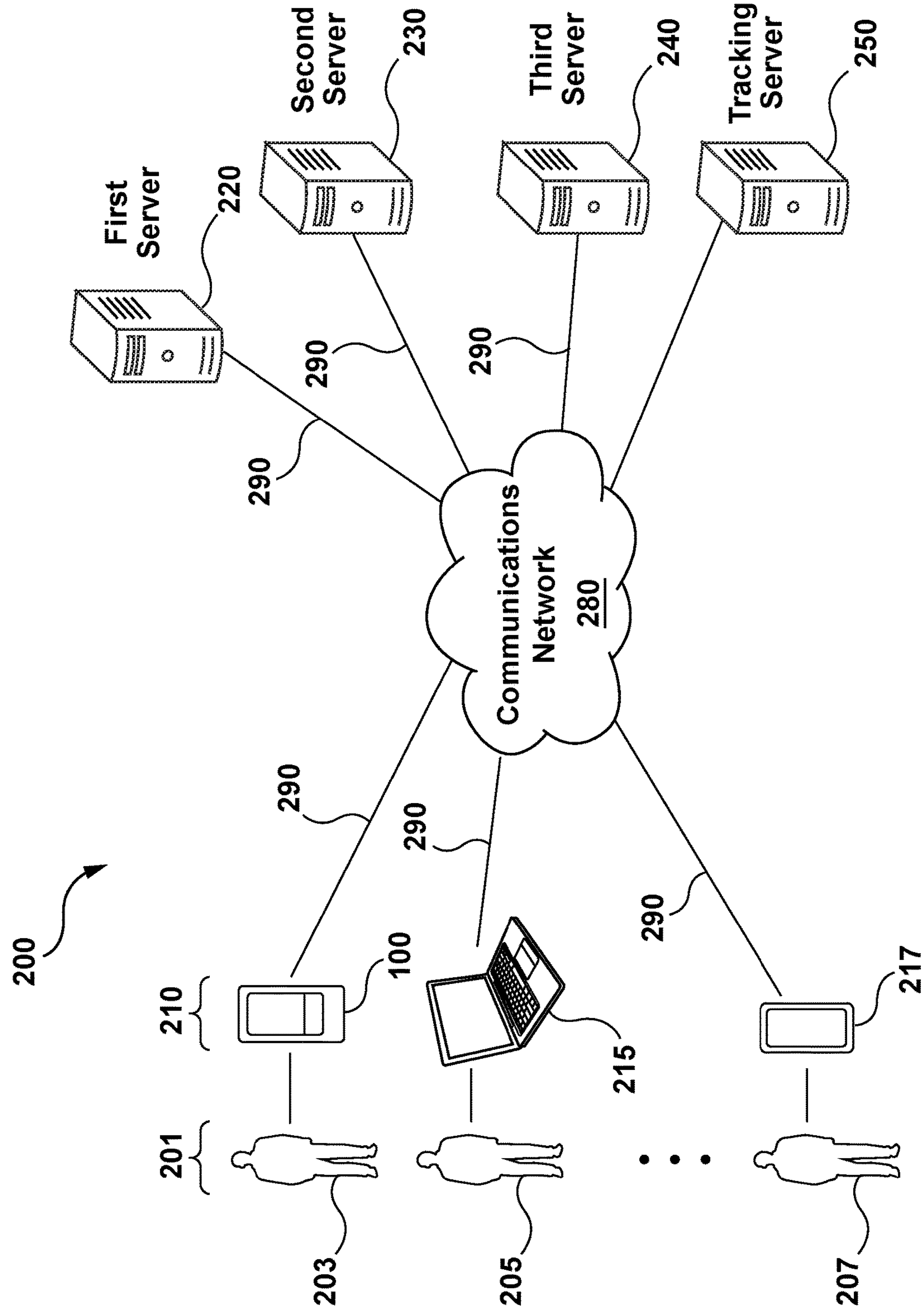
FIG. 2 is an illustration of a system that includes the client device of FIG. 1 implemented in accordance with an embodiment of the present technology.

Now turning to FIG. 2, a communication system 200 is illustrated in accordance with an embodiment of the present technology. The communication system 200 comprises a plurality of users 201, the plurality of users 201 comprising a first user 203, a second user 205 and a third user 207 respectively associated with the first client device 100, a second client device 215 and a third client device 217, coupled to a communications network 280 via a communication link 290. The second client device 215 may be implemented as a laptop and the third client device 217 may be implemented as a smartphone. In some non-limiting embodiments of the present technology, the communications network 280 can be implemented as the Internet. In other embodiments of the present technology, the communications network 280 can be implemented differently, such as any wide-area communications network, local-area communications network, a private communications network and the like.

How the communication link 290 is implemented is not particularly limited and will depend on how the first client device 100, the second client device 215 and the third client device 217 are implemented. Merely as an example and not as a limitation, in those embodiments of the present technology where at least one of the first client device 100, the second client device 215 and the third client device 217 is implemented as a wireless communication device (such as a smart-phone), the communication link 290 can be implemented as a wireless communication link (such as but not limited to, a 3G communications network link, a 4G communications network link, a Wireless Fidelity, or WiFi® for short, Bluetooth® and the like). In those examples, where at least one of the first client device 100, the second client device 215 and the third client device 217 is implemented as a notebook computer, the communication link 290 can be either wireless (such as the Wireless Fidelity, or WiFi® for short, Bluetooth® or the like) or wired (such as an Ethernet based connection).

It should be expressly understood that implementations for the first client device 100, the second client device 215 and the third client device 217, the communication link 290 and the communications network 280 are provided for illustration purposes only. As such, those skilled in the art will easily appreciate other specific implementational details for the first client device 100, the second client device 215, the third client device 217, the communication link 290 and the communications network 280. As such, by no means, examples provided herein above are meant to limit the scope of the present technology.

Also coupled to the communications network is a first server 220, a second server 230, a third server 240 and a tracking server 250. The first server 220, the second server 230, the third server 240, and the tracking server 250 can all be implemented as conventional computer servers. In an example of an embodiment of the present technology, the first server 220, the second server 230, the third server 240, and the tracking server 250 can be implemented as a Dell™ PowerEdge™ Server running the Microsoft™ Windows Server™ operating system. Needless to say, the first server 220, the second server 230, the third server 240, and the tracking server 250 can be implemented in any other suitable hardware and/or software and/or firmware or a combination thereof.

In the depicted non-limiting embodiment of present technology, the first server 220, the second server 230, the third server 240, and the tracking server 250 are each independent servers. In alternative non-limiting embodiments of the present technology, the functionality of each one of the first server 220, the second server 230, the third server 240, and the tracking server 250 may be implemented on a single server or may be distributed and implemented on multiple servers (not depicted).

Figure 3:
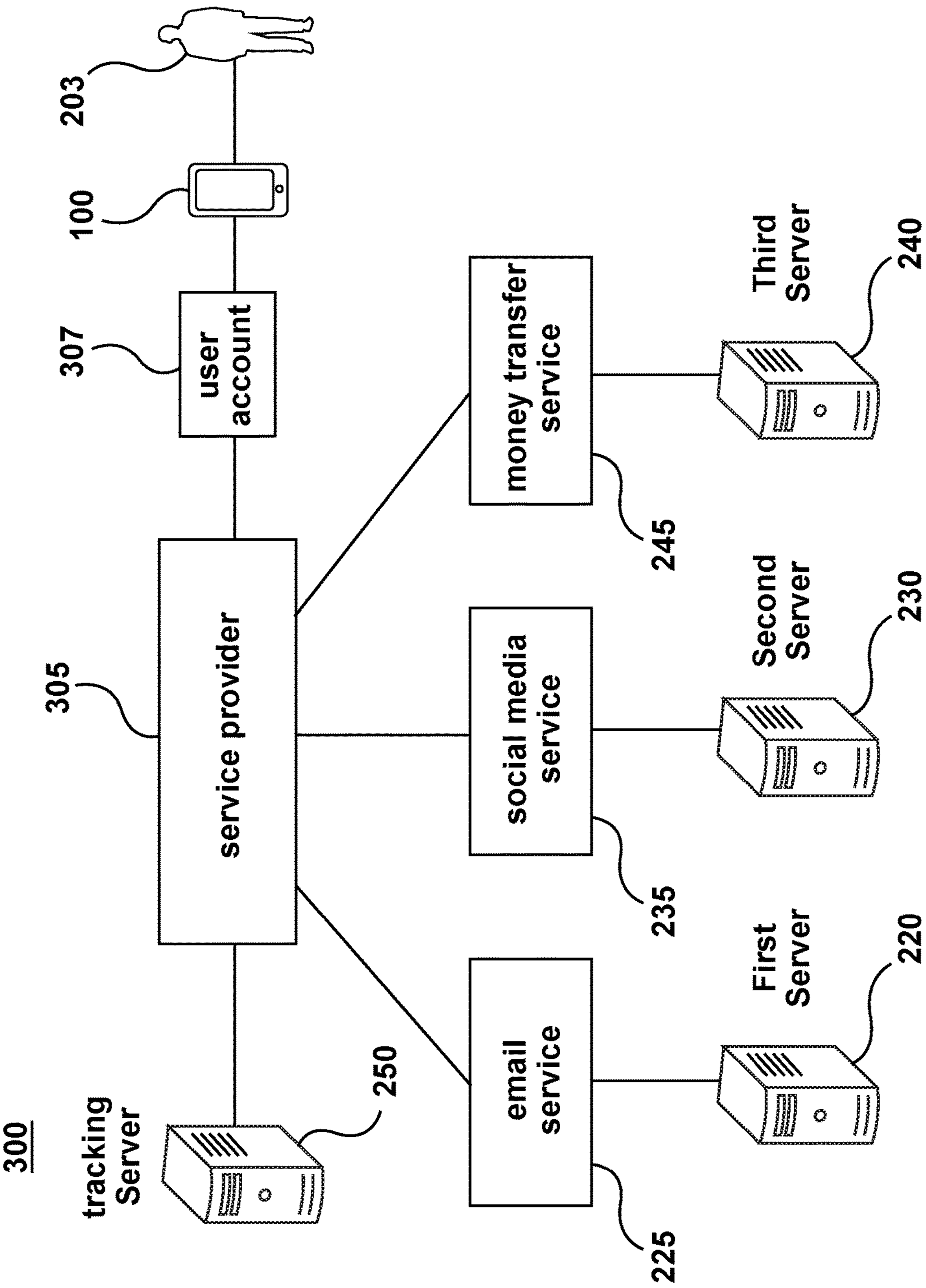
FIG. 3 is an illustration of services provided by a service provider implemented on the system of FIG. 2 in accordance with an embodiment of the present technology.

Now turning to FIG. 3, a plurality of services 300 are illustrated. A service provider 305 may provide a plurality of services, referred as services or application services, to users on the Internet. Examples of service providers include Yandex™, Google™, Yahoo™, and Facebook™. Generally, a user, such as the first user 203, may register for a user account 307 with the service provider 305 via his first client device 100, and access a plurality of services, such as an email service 225 hosted on the first server 220, a social media service 235 hosted on the second server 230 and a money transfer service 245 hosted on the third server 240 via a browser (by accessing the website associated with the service) or a stand alone application that can be executed on the first client device 100.

The service provider 305 (and each one of the email service 225, the social media service 235 and the money transfer service 245) may be connected to the tracking server 250. In other embodiments, the first user 203 may have registered with a first service, such as the email service 225, which may be associated with the service provider 305, and the service provider 305 may automatically create and link the user account 307 with the social media service 235 and the money transfer service 245. In other non-limiting embodiments, the first user 203 may have registered with the email service 225 and may have manually linked his accounts with the social media service 235 and the money transfer service 245 (that may be associated with a different service provider) and authorized tracking of his user activity by the tracking server 250. The sharing of the user account 307 is typically done through a single sign-on application, such as Yandex.Passport™ or the like.

The service provider 305 may manage the tracking server 250, and the tracking server 250 may track user activity and generate a user challenge procedure for each user (such as the first user 203, the second user 205 and the third user 207) associated with the plurality of services. However, in other embodiments, the functionality of the tracking server 250 may be implemented directly on at least one of the first server 220, the second server 230 and the third server 240 or directly on each one of the first client device 100, the second client device 215 and the third client device 217.

As such, the tracking server 250 may receive every user interaction performed by a user, such as the first user 203, on an application service, such as each one of the email service 225, the social media service 235 and the money transfer service 245 on his first client device 100 (or another client device the first user 203 may be using), and may maintain a log of user activity. In other embodiments, the tracking server 250 may only receive a selected subset of user interactions performed by the first user 203 on the first client device 100. The selected subset of user interactions may comprise only user interactions that are usually associated with abnormal user activity based on past user activity.

How the tracking server 250 maintains a log of user activity is not limited and is well known in the art. As an example, each user interaction or user event received by the tracking server 250, directly from the first client device 100 or from one of the first server 220, the second server 230 and the third server 240, may be associated with an IP address, a device identifier, a timestamp including the date, time, and time zone, a status, a content, and a score associated with the status.

Different user interactions may be associated with different scores, each respective score representative of the importance of the respective user interaction, where user interactions that may be indicators of a compromised account (such as sending an email to the entire contact list, changing personal information associated with the account) are associated with a higher score, and where user interactions that are indicators of normal behavior a user may engage in (such as reading an email, sending a single email, deleting an email) are associated with a lower score. Each score associated with a user interaction may be set manually by an administrator of the service provider 306, or by a machine learning algorithm on the tracking server 250. Furthermore, the scores associated with the user interactions may be continuously updated depending on the results obtained, such as if a user reports that his account was compromised when the tracking server 250 did not detect abnormal activity or vice versa.

Now turning to FIGS. 4-6, non-limiting examples of a first table of user activity 410, a second table of user activity 510 and a third table of user activity associated with a respective service and the user account 307 from which a first threshold and second threshold may be determined are illustrated.

The first table of user activity 410 may be associated with the email service 225, the second table of user activity 510 may be associated with the social media service 235 and the third table of user activity 610 may be associated with the money transfer service 245, and each one of the first table of user activity 410, the second table of user activity 510 and the third table of user activity 610 may be associated with the user account 307 of the first user 203.

The first table of user activity 410, the second table of user activity 510 and the third table of user activity 610 may be used to determine a respective first threshold of user activity and a second threshold of user activity for the first user 203. The respective first threshold of user activity may be used to detect user activity on an account (e.g. the user account 307) associated with at least one service that may be abnormal compared to the past user activity associated with the same account and the at least one service (e.g. the email service 225). User activity exceeding the first threshold may potentially indicate that the user account (e.g. the user account 307) or the client device (e.g. the first client device 100) have been compromised, and trigger a more exhaustive/rigorous tracking of the user activity on the at least one service during a predetermined time period. The user activity on the at least one service exceeding a second global threshold may indicate that the user account (e.g. the user account 307) or the client device (e.g. the first client device 100) has been compromised, and trigger a user challenge procedure to authenticate the user (e.g. the first user 203) of the user account (e.g. the user account 307) and the client device (e.g. the first client device 100). The user challenge procedure may include querying the user about past user activity before reaching the first threshold.

The first table of user activity 410 associated with the email service 225 includes a client device user activity column 415 and a tracking server user activity column 420. The client device user activity column 415 may represent user activity performed by the first user 203 on a client device (such as the first client device 100), and the tracking server user activity column 420 may represent the information associated with the user activity as received by the tracking server 250 (directly from the first client device 100 or via the first server 220, the second server 230 or the third server 240).

The tracking server user activity column 420 includes an IP address column 422, a timestamp column 424, a user interaction status 426, a content column 428 and a score column 429. The IP address column 422 represents the IP address of the first client device 100 from which a user interaction has been logged, the timestamp column 424 represents the date, time and time zone at which the user interaction has been performed, the user interaction status 426 represents the status associated with the user interaction, the content column 428 represents content associated with the user interaction and the score column 430 represents a score associated with the status of the user interaction performed on the first client device 100 (or another client device used by the first user 203). The content of a user interaction may depend on the type of user interaction, and may include the geographical location of the user interaction, textual content of the user interaction (such as use of certain keywords), language of the user interaction, the recipient(s) of the user interaction, the time taken by the user to perform the user interaction, the speed of a mouse pointer, the type of virtual keyboard used for the user interaction, and other data associated with a user interaction that may be tracked by a client device (such as the first client device 100).

The content of each user interaction may only be tracked during a pre-defined period of time after the first user 203 has registered with the service provider 305, to determine a first threshold and a second threshold. In some embodiments of the present technology, the first threshold and the second threshold can be updated from time to time or on a regular basis.

As such, each user interaction performed on the email service 225 may have a corresponding entry in each one of the IP address column 422, the timestamp column 424, the user interaction status 426, the content column 428 and the score column 429.

In a first interaction 430, the first user 203 may open the email service 225 via an email application previously acquired from an application store (or browse to the email service 225 via a browser application (not depicted)) on his first client device 100 and login to his user account 307. The first interaction may create an entry in the first table of user activity 410, the entry comprising an IP address (127.0.0.1), a timestamp (01.02.2017 08:14:59-0700), a status (user_login=1), a content (null) and the score (0.5)

The first user 203 may then engage in a plurality of user interactions 440 at different times, each resulting in entries in some or all of the IP address column 422, the timestamp column 424, the user interaction status 426, the content column 428 and the score column 429. The plurality of user interactions 440 depicted in FIG. 4 is nonexhaustive and may comprise opening and reading an email, sending an email, changing a password, changing a phone number, deleting an email. The first user 203 may also connect to his account from a different client device (not depicted), which may have been previously registered with the email service 225. The first user 203 may also interact with the email service 225 from a different IP address or location.

The first table of user activity 410 may then be used to determine a first threshold of user activity for the email service 225.

Now turning to FIG. 5, the second table of user activity 510 associated with the social media service 235 includes a client device user activity column 515 and a tracking server user activity column 520. The client device user activity column 515 may represent user activity performed by the first user 203 on a client device (such as the first client device 100), and the tracking server user activity column 520 may represent the information associated with the user activity as received by the tracking server 250 (directly from the first client device 100 or via the first server 220, the second server 230 or the third server 240). The tracking server user activity column 520 includes an IP address column 522, a timestamp column 524, a user interaction status 526, a content column 528 and a score column 529. The IP address column 422 represents the IP address of the first client device 100 from which a user interaction has been logged, the timestamp column 524 represents the date, time and time zone at which the user interaction has been performed, the user interaction status 526 represents the status associated with the user interaction, the content column 528 represents content associated with the user interaction and the score column 529 represents a score associated with the status of the user interaction performed on the first client device 100 (or another client device used by the first user 203). As such, each user interaction performed on the social media service 235 may have a corresponding entry in at least some of the IP address column 522, the timestamp column 524, the user interaction status 526, the content column 528 and the score column 529.

The first user 203 may then engage in a plurality of user interactions 530 at different times, each comprising entries in the IP address column 522, the timestamp column 524, the user interaction status 526, the content column 528 and the score column 529. As with the non-limiting example depicted in FIG. 4, the plurality of user interactions 530 depicted in FIG. 5 is nonexhaustive list and may comprise adding a contact, posting a status update, writing a review for a place, check-in in a place.

The second table of user activity 510 may then be used to determine a first threshold of user activity for the social media service 235.

Now turning to FIG. 6, the third table of user activity 610 associated with the money transfer service 245 includes a client device user activity column 615 and a tracking server user activity column 620. The client device user activity column 615 may represent user activity performed by the first user 203 on a client device (such as the first client device 100), and the tracking server user activity column 620 may represent the information associated with the user activity as received by the tracking server 250 (directly from the first client device 100 or via the first server 220, the second server 230 or the third server 240).

The tracking server user activity column 620 includes an IP address column 622, a timestamp column 624, a user interaction status 626, a content column 628 and a score column 629. The IP address column 622 represents the IP address of the first client device 100 from which a user interaction has been logged, the timestamp column 624 represents the date, time and time zone at which the user interaction has been performed, the user interaction status 626 represents the status associated with the user interaction, the content column 628 represents content associated with the user interaction and the score column 629 represents a score associated with the status of the user interaction performed on the first client device 100 (or another client device used by the first user 203). As such, each user interaction performed on the money transfer service 245 may have a corresponding entry in at least some of the IP address column 622, the timestamp column 624, the user interaction status 626, the content column 628 and the score column 629.

The first user 203 may engage then in a plurality of user interactions 640 at different times, each comprising entries in at least some of the IP address column 622, the timestamp column 624, the user interaction status 626, the content column 628 and the score column 629. As with the non-limiting example depicted in FIG. 4, the plurality of user interactions 640 depicted in FIG. 6 is nonexhaustive list and may comprise transferring money, paying a bill and buying an item online.

After a predetermined period of time, number of user interactions or number of logins, the tracking server 250 may determine a respective first threshold for the user activity associated with each one of the email service 225, the social media service 235 and the money transfer service 245. In some embodiments, the respective first threshold may be based on past user activity of users with similar attributes (such as age, geographic location, occupation, etc.) having interacted with each one of the email service 225, the social media service 235 and the money transfer service 245 in the past. In other embodiments, the respective first threshold may be the same for every user having registered with each one of the email service 225, the social media service 235 and the money transfer service 245.

In some embodiments, a statistical analysis may be performed (as an example with a machine learning algorithm) on the user activity associated with each service, such as the user activity in each one of the first table of user activity 410, the second table of user activity 510 and the third table of user activity 610. The first table of user activity 410, the second table of user activity 510 and the third table of user activity 610 may be used respectively as past user activity of the first user 203 for the email service 225, the social media service 235 and the money transfer service 245, from which the tracking server 250 may determine behavior patterns of normal or non-suspicious user activity by looking at the status of a user interaction, the score associated with the user interaction and the timestamp associated with the user interaction.

As a non-limiting example, behavior patterns may include time at which the user interacts with the service, the status of user interaction, and the score of the user interaction, such as paying his membership every two week before 9 AM with the money transfer service 245, posting a status update every evening at 8 PM on the social media service 235, sending an email to his daughter every day at lunch time, etc.

Therefore, a user account, such as user account 307, may be associated with a set of behavior patterns, wherein a behavior pattern may comprise a status of a user interaction, a score associated with the user interaction and a time period associated with the user interaction.

After having determined the normal or usual user activity, a respective first threshold for each one of the email service 225, the social media service 235 and the money transfer service 245 may be set. As a non-limiting example, with user activity of the email service depicted in the table of user activity 410, the frequency of user activity may be considered, and a total score of user activity for a predetermined time period, such as a number of hours, days, or weeks may be set. The first threshold set for a predetermined time period may be based on the fact that a human user may not perform such interactions in such a short time frame, which may indicate that the user account or the user device has been compromised by a virus or bot. The respective predetermined threshold may be based on the user activity of a plurality of users interacting with the respective service, such as user activity of each one of the plurality of users 201 interacting with each one of the email service 225, the social media service 235 and the money transfer service 245.

The first threshold may then be determined based on the average score and the period of time. In some embodiments, each service may be associated with a plurality of first predetermined threshold based on time periods. Generally, the first threshold may be higher than the average score to account for variations in user behavior (a user may engage in more actions on a given day). The first threshold may also be continuously updated at predetermined time periods (e.g. every two weeks) based on updated user activity. Therefore, the first threshold may be used as an indicator of normal or typical user behavior, and user activity exceeding the first threshold may be indicative of abnormal user behavior and therefore classified as potentially suspicious user behavior, which may be indicative that the user account 307 or the first client device 100 has been compromised by a third party or a bot.

In the non-limiting examples depicted in FIGS. 4-6, a respective first threshold is determined based on the past user activity of the first user 203 on each one of the email service 225, the social media service 235 and the money transfer service 245. However, in alternative embodiments, a respective first threshold may be determined based on the past user activity of other users having previously registered with the email service 225, the social media service 235 and the money transfer service 245.

A determination that a given user exceeds the first threshold may be instrumental in triggering tracking of the user on at least one service of the plurality of services (such as the social media service 275 and the money transfer service 245) associated with the service provider 305 during a second time period, the second time period starting when the first threshold has been exceeded. In some embodiments, only a single service, such as the email service 225, may have its user activity tracked and associated with first threshold and a second threshold.

The tracking of the plurality of services during the second time period may be more a rigorous tracking than during the first time period where information such as the content of a user interaction including the geographic location of a user interaction and more details about the user interactions may be tracked. As an example, the tracking of the user activity during the second time period may take into account where the user clicks, the average time spent on a page of the service, keystroke analysis, the language used and lexical analysis. Broadly speaking, an objective of tracking the user activity during the second time period is to improve the discriminatory power of the tracking server 250 in determining if a user account, such as the user account 307, has been compromised.

Based on the user activity collected in each one of the first table of user activity 410, the second table of user activity 510 and the third table of user activity 610, a first threshold of a score of 20 for 24 hours may be set for the email service 225, a first threshold score of 15 for 24 hours may be set for the social media service 235 and a first threshold score of 20 for an hour may be set for the money transfer service 245.

The tracking server 250 may set a second threshold. The second threshold may be a single global threshold for the total user activity on the email service 225, the social media service 275 and the money transfer service 245 associated with the service provider 305. In other words, the second threshold may be the single global threshold for the total user activity across all application services associated with the user account 307.

The second threshold may be activated after the first threshold has been exceeded. As for the first threshold, a statistical analysis may be performed (as an example with a machine learning algorithm) on the user activity for every service managed by the service provider 305 and associated with the first user 203 of the first client device 100, and set a single global threshold for the user activity associated with the email service 225, the social media service 235 and the money transfer service 245.

As an example, the tracking server 250 may track user activity on the email service 225, as well as the social media service 235, the money transfer service 245, but also analyzes the content of each user interaction associated with each one of the email service 225, as well as the social media service 235, the money transfer service 245, to detect abnormal user activity. In some embodiments, the second threshold is a sum of the respective first thresholds. In other embodiments, there may be a plurality of second thresholds based on a respective time period.

As a non-limiting example, for the email service 225, the tracking server 250 may track the content of the user interactions, such as the email of a recipient, the presence of words "you won", "Viagra", "get for free", the language of the email, etc, which all may be associated with a score. As another non-limiting example, for the social media service 235, the tracking server 250 may also track for updates containing links to websites known to be spam, the presence of words "you won", "viagra", "get for free", "drugs", "sex", "single girls" etc. As another non-limiting example, for the money transfer service 245, interactions in foreign countries, operations including large amounts of money, frequency of the interactions, and transactions with suspicious websites may be tracked.

Based on the user activity collected in each one of the first table of user activity 410, the second table of user activity 510 and the third table of user activity 610, a second threshold of a score of 30 during an hour may be set as the second threshold, taking into account the user interaction and the content of the user interaction.

A determination that the given user exceeds the second threshold may be instrumental into triggering a user challenge procedure for the first user 203 of the first client device 100. The user challenge procedure may be sent to the first client device 100 to authenticate the user as the original owner of the user account 307 and to prevent fraudulent actions in case the user account 307 was compromised by a malevolent third party. The user challenge procedure may take different forms: biometric recognition (such as asking the user to authenticate with his fingerprint on the first client device 100, or via voice recognition by prompting the first user 203 to talk in the microphone of the first client device 100), predetermined secret question and a CAPTCHA.

Generally, the user challenge procedure may query the first user 203 about specific user interactions with at least one service that happened during the first time period, before the user activity exceeding the first threshold (which is deemed to be a "trusted" period of time in accordance with embodiments of the present technology). As a non-limiting example, the user challenge procedure may ask the user where it bought an item on a given day (which may be detailed in the third user activity table 610), the name of a person the user communicated with via the email service 225 or the social media service 235. The user challenge procedure may also query the user about personal information associated with the user account 307 or the first client device 100. The user may respond to the user challenge procedure directly by typing the answer on the first client device 100 or via his microphone by receiving an automated phone call on the first client device 100.

Broadly speaking, the objective of the user challenge procedure is to verify if the user account 307 is used by the first user 203. If the response to the challenge procedure is positive, i.e. the user provides the right answer, the tracking server 250 may allow the user to resume user activity on each one of the email service 225, the social media service 235 and the money transfer service 245. If the response to the user challenge procedure is negative, i.e. the first user 203 provides a wrong answer, the access to each one of the email service 225, the social media service 235 and the money transfer service 245 may be partially or completely blocked, until the first user 203 contacts the service provider 305 and provides enough information to authenticate himself. In some embodiments, the user challenge procedure may combine different types of user challenges such as questions and biometric identification.

As it may be understood by a person skilled in the art, the first threshold and the second threshold may or may not be personalized or only one of the first threshold and the second threshold may be personalized.

Now turning to FIGS. 7-10, non-limiting examples of a plurality of tables of user activity 400 associated with a respective service and the user account 307 are illustrated.

With reference to FIG. 7, the table of potentially abnormal user activity 710 associated with the email service 225 includes a client device user activity column 715 and a tracking server user activity column 720. The client device user activity column 715 may represent user activity performed by the first user 203 on a client device (such as the first client device 100), and the tracking server user activity column 720 may represent the information associated with the user activity as received by the tracking server 250 (directly from the first client device 100 or via the first server 220, the second server 230 or the third server 240).

The tracking server user activity column 720 includes an IP address column 722, a timestamp column 724, a user interaction status 726, and a score column 729. The IP address column 722 represents the IP address of the first client device 100 from which a user interaction has been logged, the timestamp column 724 represents the date, time and time zone at which the user interaction has been performed, the user interaction status 726 represents the status associated with the user interaction, and the score column 729 represents a score associated with the status of the user interaction performed on the first client device 100 (or another client device used by the first user 203). As such, each user interaction performed on the email service 225 may have a corresponding entry in at least some of the IP address column 722, the timestamp column 624, the user interaction status 726, and the score column 729.

The user account 307 may interact with the email service 225 between Feb. 4, 2017 and Feb. 14, 2017 in a first plurality of interactions 730. Then, a second plurality of interactions 750 may happen on Feb. 15, 2017, which may be abnormal.

The second plurality of interactions 750 may comprise the user account 307 changing a password from the IP address 129.0.1.1 associated with a score of 5, the user account 307 changing the phone number after 2 seconds from the IP address 128.0.1.1 associated with a score of 5, the user account 307 sending an email to the entirety of the contact list after 3 seconds from the IP address 128.0.01 associated with a score of 5, and the user account 307 changing the password for a second time after 10 seconds from IP address 129.0.1.1 associated with a score of 5, for a total score of 20 in less than a minute, which is over a predetermined threshold score of 20 for 24 hours. It may have been previously determined by an assessor (or by a machine learning algorithm) based on statistics that it is not likely that a human may perform such actions in less than 6 seconds, and may indicate that the user account 307 has been compromised.

The second plurality of interactions 750 exceeding the first predetermined threshold may be indicative of potentially abnormal user activity compared to the usual user activity, and may trigger the tracking of the user activity during a second time period, the tracking comprising tracking a content of the user interaction.

With reference to FIG. 8, a first table of abnormal user activity 810 associated with the email service 225 includes a client device user activity column 815 and a tracking server user activity column 820. The client device user activity column 815 may represent user activity performed by the first user 203 on a client device (such as the first client device 100), and the tracking server user activity column 820 may represent the information associated with the user activity as received by the tracking server 250 (directly from the first client device 100 or via the first server 220, the second server 230 or the third server 240). The tracking server user activity column 820 includes an IP address column 822, a timestamp column 824, a user interaction status 826, a content column 828 and a score column 829. The IP address column 822 represents the IP address of the first client device 100 from which a user interaction has been logged, the timestamp column 824 represents the date, time and time zone at which the user interaction has been performed, the user interaction status 826 represents the status associated with the user interaction, the content column 828 represents content associated with the user interaction and the score column 829 represents a score associated with the status of the user interaction performed on the first client device 100 (or another client device used by the first user 203). As such, each user interaction performed on the money transfer service 245 may have a corresponding entry in each one of the IP address column 822, the timestamp column 824, the user interaction status 826, the content column 828 and the score column 829.

The user account 307 may interact with the email service 225 starting on Feb. 15, 2017 in a first plurality of interactions 830. Then, a second plurality of user interactions 850 may happen on Feb. 16, 2017, which may be abnormal. The second plurality of user interactions 850 comprises the user account sending emails to the entirety of his contact list from the IP address 128.0.0.1 at 10:13:46 and then from the IP address 125.0.0.1 at 20:13:48, each associated with a score of 5.

Now turning to FIG. 9, the third table of user activity 910 associated with the social media service 235 includes a client device user activity column 915 and a tracking server user activity column 920. The client device user activity column 915 may represent user activity performed by the first user 203 on a client device (such as the first client device 100), and the tracking server user activity column 920 may represent the information associated with the user activity as received by the tracking server 250 (directly from the first client device 100 or via the first server 220, the second server 230 or the third server 240). The tracking server user activity column 920 includes an IP address column 922, a timestamp column 924, a user interaction status 926, a content column 928 and a score column 929. The IP address column 922 represents the IP address of the first client device 100 from which a user interaction has been logged, the timestamp column 924 represents the date, time and time zone at which the user interaction has been performed, the user interaction status 926 represents the status associated with the user interaction, the content column 928 represents content associated with the user interaction and the score column 929 represents a score associated with the status of the user interaction performed on the first client device 100 (or another client device used by the first user 203). As such, each user interaction performed on the money transfer service 245 may have a corresponding entry in each one of the IP address column 922, the timestamp column 924, the user interaction status 926, the content column 928 and the score column 929.

The user account 307 may interact with the social media service 235 starting on Feb. 15, 2017 in a first plurality of interactions 930. Then, a second plurality of interactions 950 may happen on Feb. 16, 2017, which may be abnormal. The second plurality of interactions 950 may all be status updates from two different IP addresses 127.0.0.1 and 128.0.0.1 in the space of one hour, each containing a link to a website known to be a phishing website, which may be banned. Each one of the plurality of interactions 950 may be associated with a score of 5, for a total of score 30 between 20:12:59 and 20:44:35.

Now turning to FIG. 10, the third table of abnormal user activity 1010 associated with the money transfer service 245 includes a client device user activity column 1015 and a tracking server user activity column 1020. The client device user activity column 1015 may represent user activity performed by the first user 203 on a client device (such as the first client device 100), and the tracking server user activity column 1020 may represent the information associated with the user activity as received by the tracking server 250 (directly from the first client device 100 or via the first server 220, the second server 230 or the third server 240).

The tracking server user activity column 1020 includes an IP address column 1022, a timestamp column 1024, a user interaction status 1026, a content column 1028 and a score column 1029. The IP address column 1022 represents the IP address of the first client device 100 from which a user interaction has been logged, the timestamp column 1024 represents the date, time and time zone at which the user interaction has been performed, the user interaction status 1026 represents the status associated with the user interaction, the content column 1028 represents content associated with the user interaction and the score column 1029 represents a score associated with the status of the user interaction performed on the first client device 100 (or another client device used by the first user 203). As such, each user interaction performed on the money transfer service 245 may have a corresponding entry in at least some of the IP address column 1022, the timestamp column 1024, the user interaction status 1026, the content column 1028 and the score column 1029.

The user account 307 may interact with the money transfer service 245 starting on Feb. 15, 2017 in a first plurality of interactions 1030. Then, a second plurality of interactions 1050 may happen on Feb. 16, 2017, which may be abnormal. The second plurality of interactions 1050 may comprise the user transferring money twice to an unknown contact in Hong-Kong from the IP address 128.0.0.1, which may be associated with a score of 3 and buying 4 gift cards in a Hong Kong store from the IP address 128.4.5.1 and the IP address 128.3.5.1, which may all be associated with a score of 8, for a total score of 30 from 20:13:51 to 20:14:08.

The tracking server 250 may determine that the second threshold has been exceeded by adding the total scores of user activity of each one of the email service 225, the social media service 235, and the money transfer service 245, and considering the respective time stamps for a total score of user activity of 5+30+30=70 on Feb. 16, 2017 between 20:12:59 and 20:55:35. The tracking server 250 may then trigger a user challenge procedure on the first client device 100.

Figure 11:
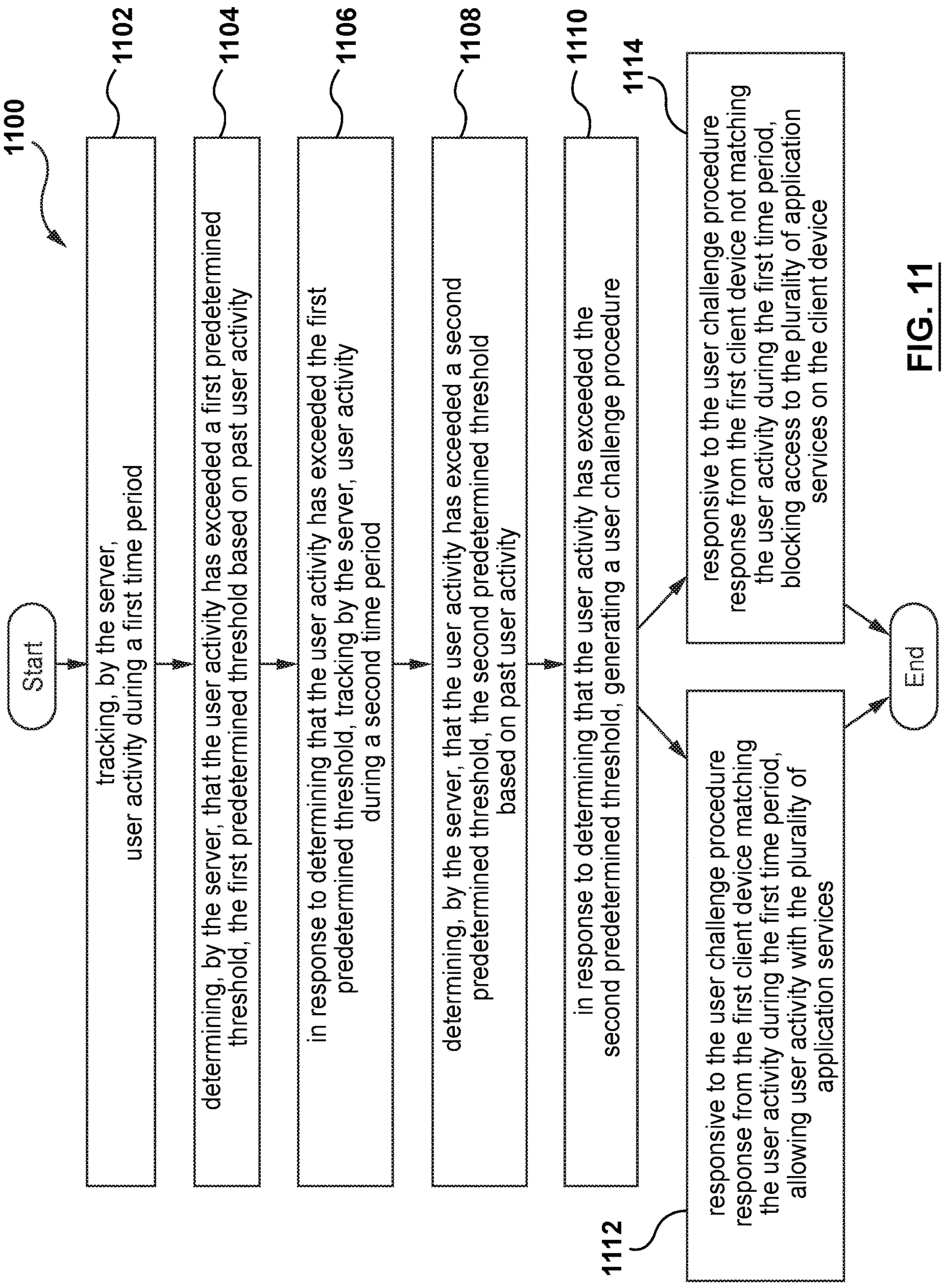
FIG. 11 is a flow-chart illustration of a method carried out by a server for detecting suspicious user activity implemented in accordance with non-limiting embodiments of the present technology.

Now turning to FIG. 11, a flowchart of a method 1100 for detecting abnormal user activity is illustrated.

In some embodiments of the present technology, the method 1100 may be executed for a single service, the email service 225. In other embodiments, the method 1100 may be executed for a plurality of services, such as the email service 225, the social media service 235 and the money transfer service 245. The method 1100 may be executed by the tracking server 250 and start at step 1102.

STEP 1102: tracking, by the server, user activity during a first time period At step 1102, the tracking server 250 may track, during a first time period, user activity associated with the email service 225, the tracking including receiving, at the tracking server, an indication of a user interaction with the email service 225, and associating a score, a timestamp and a status with the indication of the user interaction. In some embodiments, the tracking comprises tracking the user activity associated with each one of the email service 225, the social media service 235 and the money transfer service 245. The method 1100 may then advance to step 1104.

STEP 1104: determining, by the server, that the user activity has exceeded a first predetermined threshold, the first predetermined threshold based on past user activity At step 1104, the tracking server 250 may determine that the user activity associated with the email service 225 exceeds a first predetermined threshold of user activity during the first time period, the first predetermined threshold having been determined based on past user activity associated with the email service 225 and performed on each client device of the plurality of client devices 210 by a respective user, the user activity exceeding the first predetermined threshold being indicative of a potentially abnormal user activity on the email service 225 associated with the first client device 100. In some embodiments, each one of the email service 225, the social media service 235 and the money transfer service 245 may be associated with a respective first predetermined threshold based on past user activity associated respectively with each one of the email service 225, the social media service 235 and the money transfer service 245 and based on past user activity. The method 1100 may then advance to step 1106.

STEP 1106: in response to determining that the user activity has exceeded the first predetermined threshold, tracking by the server, user activity during a second time period At step 1106, in response to determining that the user activity exceeds the first predetermined threshold, the tracking server 250 may track, during a second time period, user activity associated with the email service 225 the tracking comprising tracking a content of the user interactions with the email service 225, the content comprising at least one of a text content, a geolocation parameter, a device identifier, a banned keyword, and a banned website link. In some embodiments, the tracking server may track each one of the email service 225, the social media service 235 and the money transfer service 245 during the second time period, the tracking comprising tracking a content of the user interactions of each one of the email service 225, the social media service 235 and the money transfer service 245. The method 1100 may then advance to step 1108.

STEP 1108: determining, by the server, that the user activity has exceeded a second predetermined threshold, the second predetermined threshold based on past user activity At step 1108, the tracking server 250 may determine that the user activity exceeds a second predetermined threshold of user activity during the second time period, the second predetermined threshold having been determined based on past user activity associated with the email service 225 the user activity exceeding the second predetermined threshold being indicative of an abnormal user activity. In some embodiments, the second predetermined threshold may be a single global threshold for the user activity on the email service 225, the social media service 235 and the money transfer service 245. The method 1100 may then advance to step 1110.

STEP 1110: in response to determining that the user activity has exceeded the second predetermined threshold, generating a user challenge procedure.

At step 1110, in response to determining that the user activity exceeds the second predetermined threshold, the tracking server 250 may trigger a user challenge procedure on the first client device 100, the user challenge procedure for authenticating the first user 203 of the first client device 100, the user challenge procedure being based on the user activity with the email service 225 during the first time period performed on the first client device 100. In some embodiments (where multiple services are tracked), the user challenge may be based on the user activity associated with one of the email service 225, the social media service 235 and the money transfer service 245 during the first time period. In other embodiments, the user challenge procedure may be based on other information associated with the first user 203 and the user account 307. In alternative embodiments, the user challenge procedure may ask the first user 203 for biometric data (such as fingerprint recognition via the first client device 100), a predetermined secret question or a CAPTCHA. The method 1100 may then advance to step 1112 or step 1114.

STEP 1112: responsive to the user challenge procedure response from the first client device matching the user activity during the first time period, allowing user activity with the plurality of application services At step 1112, responsive to the user challenge procedure response from the first client device 100 matching the user activity during the first time period, allowing user activity with the email service 225, the social media service 235 and the money transfer service 245, by the tracking server 250.

STEP 1114: responsive to the user challenge procedure response from the first client device not matching the user activity during the first time period, blocking access to the plurality of application services on the client device At step 1114, responsive to the user challenge procedure response from the first client device 100 not matching the user activity during the first time period, blocking access to the email service 225, the social media service 235 and the money transfer service 245, by the tracking server 250.

The method 1100 may then end.

Within the present description it should be understood that in any case where retrieving data from any client device and/or from any mail server is mentioned, retrieving an electronic or other signal from corresponding client device (a server, a mail server) can be used, and displaying on a screen of the device can be implemented as transmitting a signal to the screen, the signal includes specific information which further can be interpreted with specific images and at least partially displayed on the screen of the client device. Sending and receiving the signal is not mentioned in some cases within the present description to simplify the description and as an aid to understanding. Signals can be transmitted using optical methods (for example, using fiber-optic communication), electronic methods (wired or wireless communication), mechanic methods (transmitting pressure, temperature and/or other physical parameters by the means of which transmitting a signal is possible.

The invention claimed is:

1. A method for detecting abnormal user activity, the method executable on a server, the server being connected to a plurality of client devices via a communication network, each client device of the plurality of client devices being associated with a respective user, the method comprising:

tracking, by the server, during a first time period, user activity associated with a plurality of application services performed on a first client device, the user activity including user interactions with the plurality of application services, the tracking comprising receiving, at the server, an indication of a respective user interaction with a respective application service, and associating a score, a timestamp and a status with the indication of the user interaction, wherein each application service of the plurality of application services is associated with a respective first predetermined threshold, and wherein the plurality of application services is associated with a single second predetermined threshold; and each respective first predetermined threshold associated with each application service of the plurality of application services is a respective first average score, the respective first average score having been determined based on the scores associated with each past user interaction on the respective application service on each client device of the plurality of client devices by the respective user;

determining, by the server, that user activity associated with a first application service of the plurality of application services exceeds a respective first predetermined threshold of the user activity during the first time period, the determining comprising adding each score associated with each user interaction of the user activity associated with the first application service during the first time period and comparing a total score to the respective first average score; and the user activity exceeding the respective first predetermined threshold being indicative of a potentially abnormal user activity on the first application service associated with the first client device;

in response to determining that the user activity associated with the first application service exceeds the respective first predetermined threshold, tracking, during a second time period, by the server, user activity associated with the plurality of application services on the first client device, the tracking comprising tracking a content of the user interactions with the plurality of application services;

determining, by the server, that the user activity exceeds the single second predetermined threshold of user activity during the second time period, the single second predetermined threshold having been determined based on past user activity associated with the plurality of application services and performed on each client device of the plurality of client devices, the user activity exceeding the single second predetermined threshold being indicative of an abnormal user activity associated with the first client device;

in response to determining that the user activity exceeds the second predetermined threshold, triggering, by the server, a user challenge procedure on the first client device, the user challenge procedure for authenticating the user of the first client device, the user challenge procedure being based on the user activity with the first application service during the first time period performed on the first client device.

2. The method of claim 1, further comprising: responsive to the user challenge procedure response from the first client device matching the user activity during the first time period, allowing user activity with the plurality of application services, and responsive to the user challenge procedure response from the first client device not matching the user activity during the first time period, blocking access to the plurality of application services on the client device.

3. The method of claim 1, wherein the single second predetermined threshold is a second average score, the second average score having been determined based on the scores associated with each past user interaction of the past user activity on the plurality of application services.

4. The method of claim 3, wherein determining that the user activity exceeds the single second predetermined threshold during the second time period comprises adding each score associated with each user interaction of the user activity during the second time period and comparing a total score to the respective second average score.

5. The method of claim 4, wherein the first predetermined threshold and the single second predetermined threshold are further based on the timestamps of the user activity.

6. The method of claim 5, wherein the content of the user interaction comprises at least one of a text content, a geolocation parameter, a device identifier, a banned keyword, and a banned website link.

7. The method of claim 6, wherein the user challenge procedure comprises a question about a specific user interaction associated with an application service of the plurality of application services during the first time period.

8. A system for detecting abnormal user activity, the system being connected to a plurality of client devices via a communication network, each client device of the plurality of client devices being associated with a respective user, the system comprising:

a processor;

a non-transitory computer-readable medium comprising instructions, the processor;

upon executing the instructions, being configured to cause:

tracking, by the system, during a first time period, user activity associated with a a plurality of application services performed on a first client device, the user activity including user interactions with the plurality of application services, the tracking comprising receiving, at the server, an indication of a respective user interaction with a respective application service, and associating a score, a timestamp and a status with the indication of the user interaction, wherein each application service of the plurality of application services is associated with a respective first predetermined threshold, and wherein the plurality of application services is associated with a single second predetermined threshold; and each respective first predetermined threshold associated with each application service of the plurality of application services is a respective first average score, the respective first average score having been determined based on the scores associated with each past user interaction on the respective application service on each client device of the plurality of client devices by the respective user;

determining, by the system, that user activity associated with a first application service of the plurality of application services exceeds a respective first predetermined threshold of the user activity during the first time period, the determining comprising adding each score associated with each user interaction of the user activity associated with the first application service during the first time period and comparing a total score to the respective first average score; and the user activity exceeding the respective first predetermined threshold being indicative of a potentially abnormal user activity on the first application service associated with the first client device;

in response to determining that the user activity exceeds the respective first predetermined threshold, tracking, during a second time period, by the system, user activity associated with the plurality of application services on the first client device, the tracking comprising tracking a content of the user interactions with the plurality of application services;

determining, by the system, that the user activity exceeds the single second predetermined threshold of user activity during the second time period, the single second predetermined threshold having been determined based on past user activity associated with the plurality of application services and performed on each client device of the plurality of client devices, the user activity exceeding the second predetermined threshold being indicative of an abnormal user activity associated with the first client device;

in response to determining that the user activity exceeds the second predetermined threshold, triggering, by the system, a user challenge procedure on the first client device, the user challenge procedure for authenticating the user of the first client device, the user challenge procedure being based on the user activity with the first application service during the first time period performed on the first client device.

9. The system of claim 8, further comprising: responsive to the user challenge procedure response from the first client device matching the user activity during the first time period, allowing user activity with the plurality of application services, and responsive to the user challenge procedure response from the first client device not matching the user activity during the first time period, blocking access to the plurality of application services on the client device.

10. The system of claim 8, wherein the single second predetermined threshold is a second average score, the second average score having been determined based on the scores associated with each past user interaction of the past user activity on the plurality of application services.

* * * * *

UNITED STATES PATENT AND TRADEMARK OFFICE
CERTIFICATE OF CORRECTION

PATENT NO. : 10,581,889 B2
APPLICATION NO. : 15/864127
DATED : March 3, 2020
INVENTOR(S) : Dmitriy Nikolaevich Kovega et al.

It is certified that error appears in the above-identified patent and that said Letters Patent is hereby corrected as shown below:

In the Claims

Claim 8, Column 24, Lines 32-38, "a non-transitory computer-readable medium comprising instructions, the processor;
upon executing the instructions, being configured to cause:
tracking, by the system, during a first time period, user activity associated with a a plurality of application services performed on a first client device, the user" should read -- a non-transitory computer-readable medium comprising instructions;
the processor, upon executing the instructions, being configured to cause:
tracking, by the system, during a first time period, user activity associated with a plurality of application services performed on a first client device, the user --

Signed and Sealed this
Thirtieth Day of June, 2020

Andrei Iancu
*Director of the United States Patent and Trademark Office*